United States Patent Office 3,451,481
Patented June 24, 1969

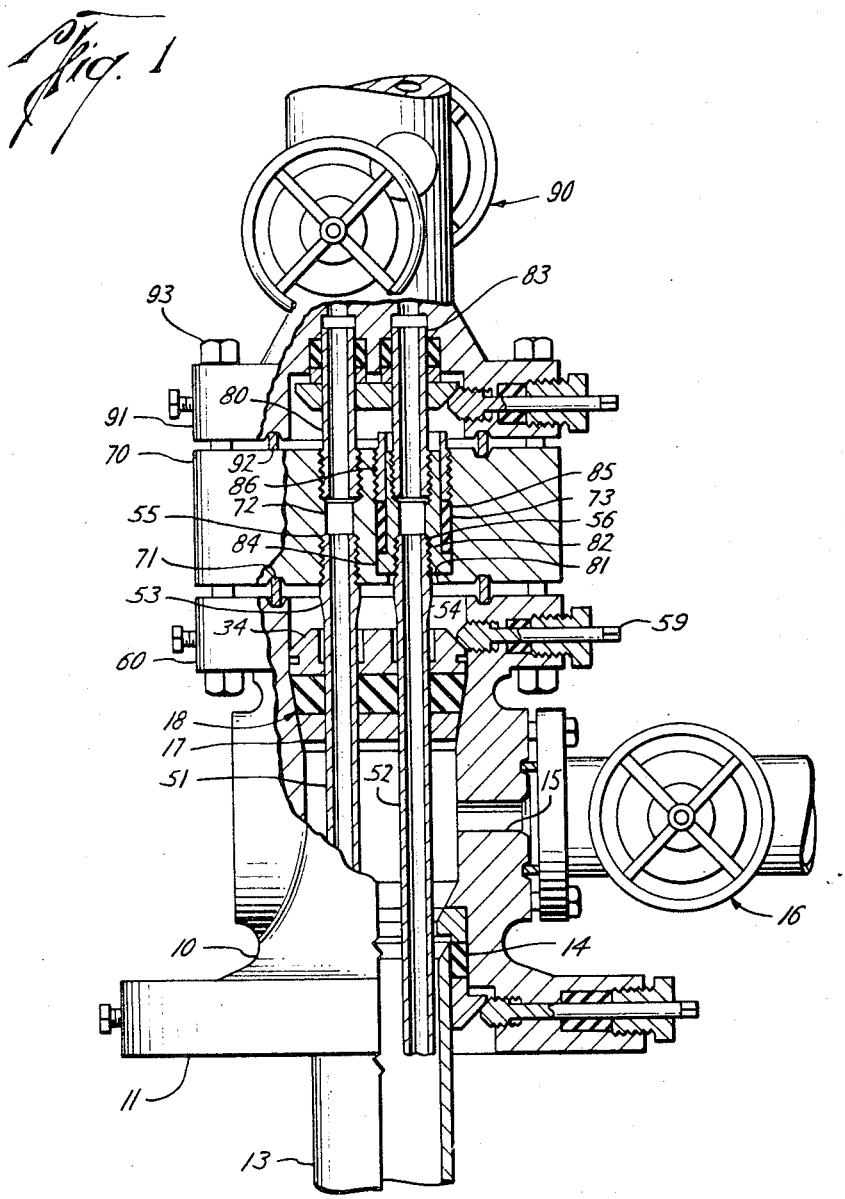

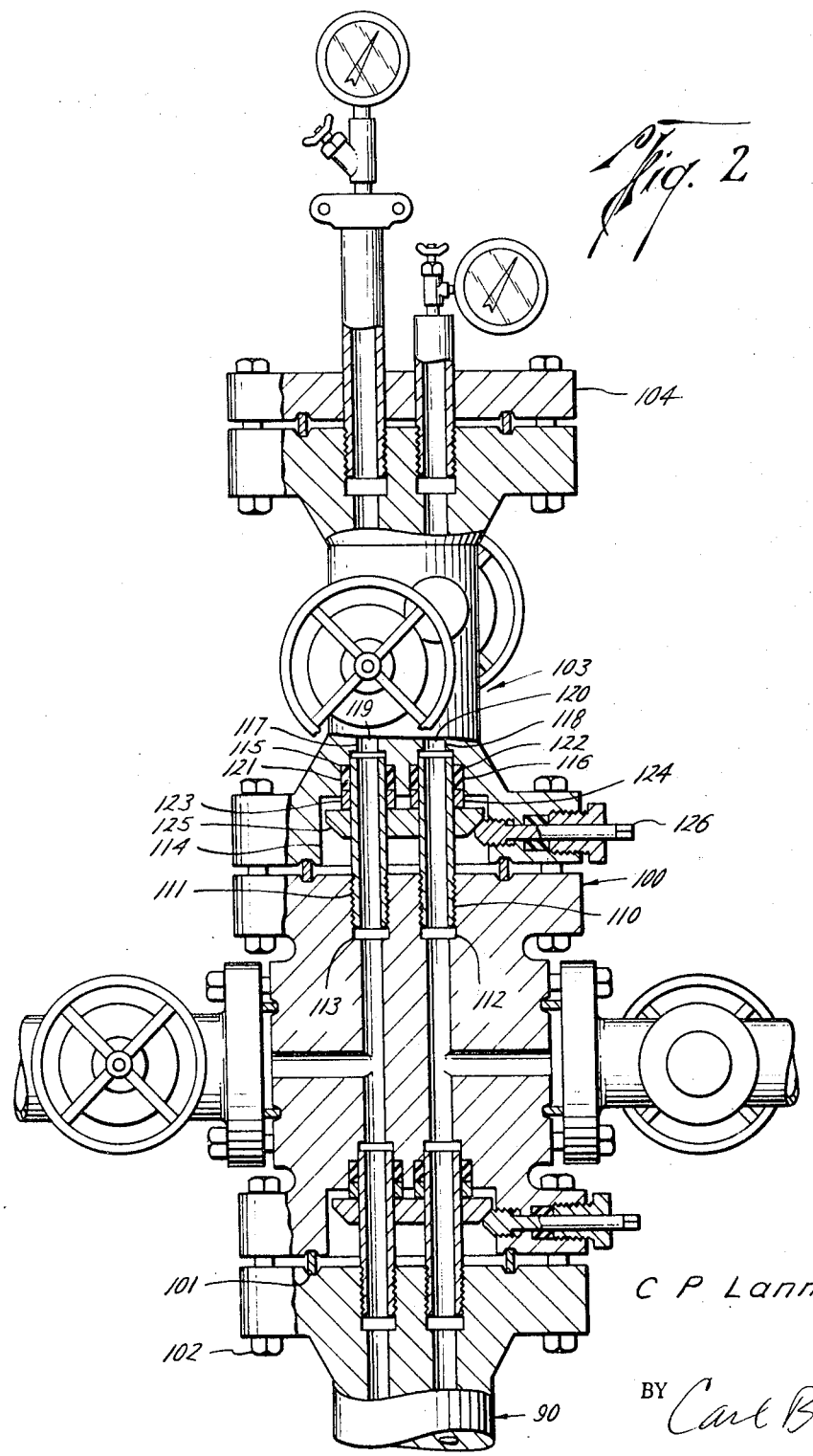

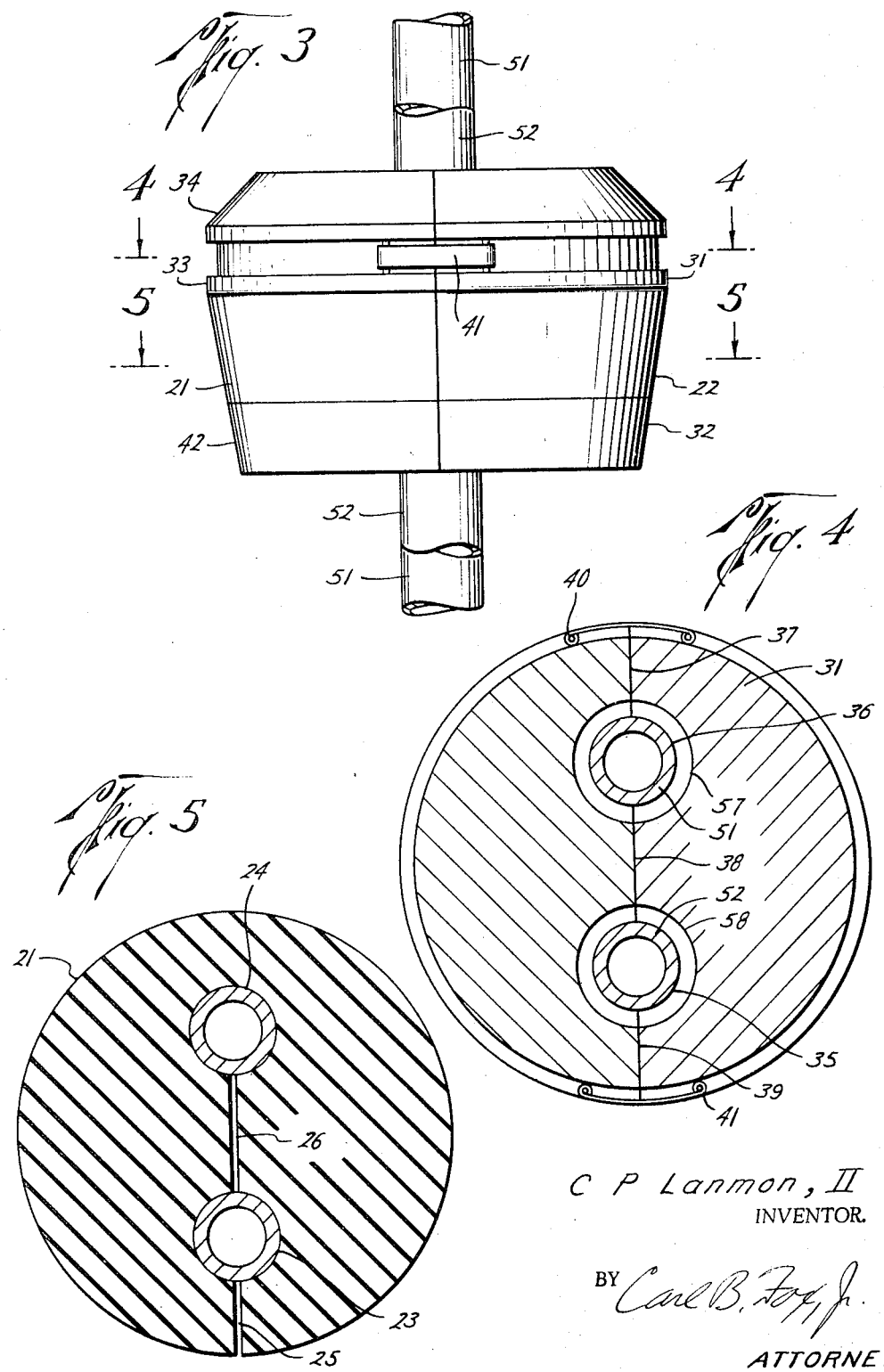

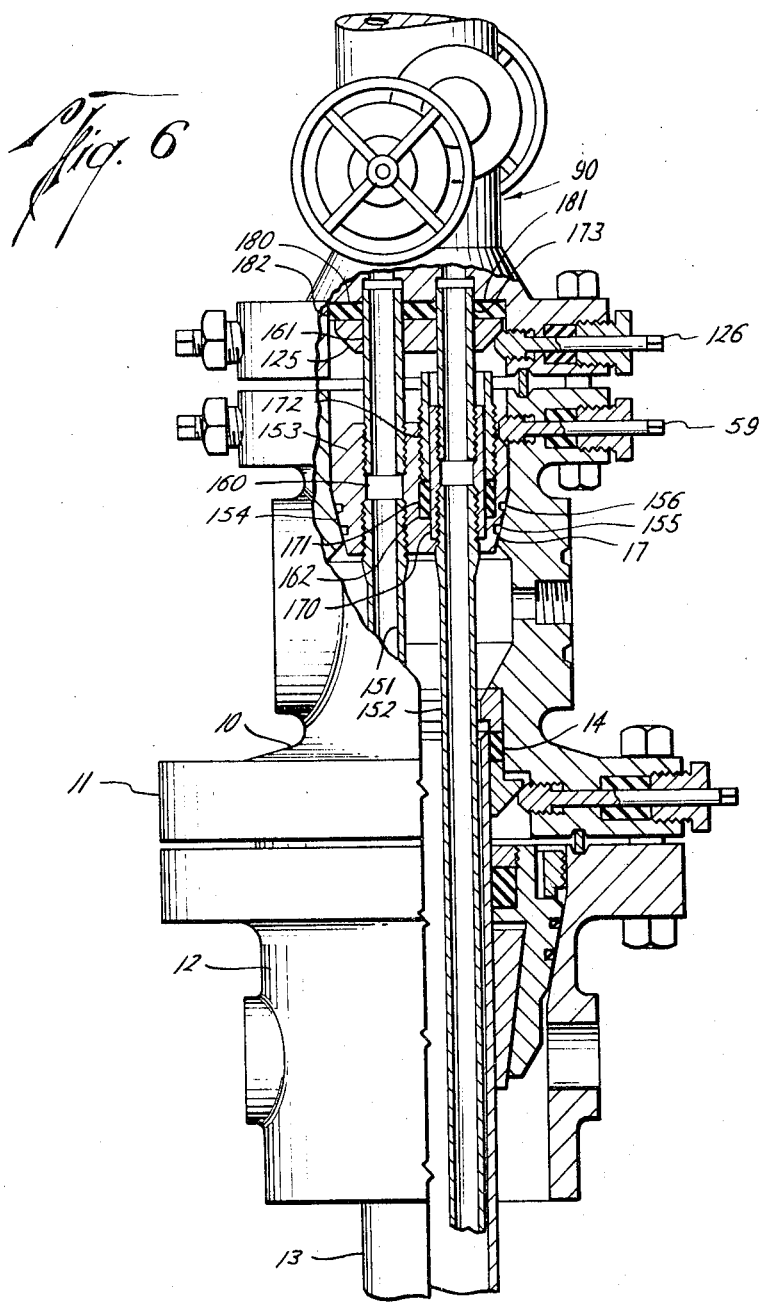

3,451,481
DUAL SUSPENSION AND SEAL
C P Lanmon II, Galveston County, Tex., assignor to Rockwell Manufacturing Company, Houston, Tex., a corporation of Pennsylvania
Continuation of application Ser. No. 492,489, Oct. 4, 1965, which is a continuation of applications Ser. No. 199,167, and Ser. No. 199,168, May 31, 1962, said applications being a division of applications Ser. No. 98,071, and Ser. No. 126,729, Mar. 24, 1961, the last two applications being a division of application Ser. No. 498,791, Apr. 4, 1955. This application June 9, 1966, Ser. No. 556,522
Int. Cl. E21b 33/03; F16l 39/00, 21/04
U.S. Cl. 166—313                    13 Claims

ABSTRACT OF THE DISCLOSURE

Method of completing under pressure a dual production zone parallel tubing string well; also, tubing hangers, seals, tree connection means, and related apparatus suitable for method. Each string of tubing is separately run through the preventer and suspended from the tubing head, e.g. by a split, wrap-around, dual bore hanger lowered through the preventer into the tubing head and receiving suspension couplings carried by the tubing, or by a dual bore suspension flange seated on top of the tubing head flange after removal of the preventer, with one tubing screwed into one bore of the flange and the other hung on a coupling in the other bore, or by two mating, screwed-on, coupling type hangers lowered through the preventer into the tubing head, the two mating hangers largely filling the opening in the top of the tubing head. Flow nipples extending up from the suspension couplings, suspension flange, or hangers form continuations of the tubing strings and are received in the lower end of a dual bore valve which, together with the upper portion of a tree, is connected above the well head, e.g. directly on top of the tubing head or with the suspension flange in between. In the latter case the bolts interconnecting the tubing head flange, the tubing suspension flange, and the dual bore valve, align the tubing strings in the suspension ring with the flow passages in the valve. Sandwich type dual bore sealing means separate from the tubing hanging means may be installed in the head to seal between the tubing and the tubing head. Dual bore sealing means is also installed above the point of tubing suspension to seal around flow nipples. Seals are also provided around the dual bore hanger. Lock screw means energize the several seals and hold down the dual bore hangers and seals in the tubing head.

This application is a continuation of my prior copending application Ser. No. 492,489 filed Oct. 4, 1965, entitled "Dual Suspension and Seal," now abandoned, which was directed to methods of completing wells and was a continuation of my two prior applications Ser. Nos. 199,167 and 199,168 filed May 31, 1962, said application Ser. No. 199,168 having been abandoned in favor of application Ser. No. 199,167 which was copending with said application Ser. No. 492,489, said applications Ser. No. 199,167 and Ser. No. 199,168 being respectively divisions of and copending with my earlier applications Ser. Nos. 98,071 and 126,729 filed Mar. 24, 1961, now merged into Pat. No. 3,185,505, the two last said applications together with application Ser. No. 98,072 filed Mar. 24, 1961, now Pat. No. 3,132,879 being divisions of my original application Ser. No. 498,791 filed Apr. 4, 1955.

This invention pertains to well completion apparatus, and more particularly to such apparatus at the surface of the earth for a parallel string dual completion, that is, for a completion in which the oil or gas may be produced from two different zones and in which two strings of tubing disposed parallel side by side extend respectively from the two production zones to the surface, as distinguished from an ordinary dual completion in which there is but one tubing string and one zone is produced through the annulus between the tubing and casing.

It is desirable to provide in such an apparatus a separate flow passage associated with each string of tubing extending in a straight line all the way to the top of the tree whereby all the usual operations carried on through the tubing during the life of a well can be carried on satisfactorily through each tubing to its particular production zone. It is also desirable in such an apparatus, when there is high pressure in both production zones, that each tubing string and associated flow passage be separated from the outside of the apparatus by high pressure resisting walls up to and through a master valve whereby blowout protection is assured. These two requirements present difficult problems with reference to the sealing and suspension of the two tubings and the surface completion equipment.

A principal object of the invention is to provide a tubing suspension for such an apparatus which will be strong and reliable.

Another object of the invention is to provide a connection between two parallel pipes and a body having two flow passages therethrough, such as a dual valve or dual T, especially adapted for use where the pipes extend from a casing head, adapter flange, valve body, or other supporting means or protecting housing having a flange adapted to be coupled to a similar flange on the dual flow passage valve, T, or other body.

The principal object of the invention is to provide improved well completion methods.

Another object of the invention is to provide a dual tubing head seal for the "annulus" or space between the tubing strings and the tubing head.

Other objects and advantages of the invention will appear from the following description of preferred embodiments thereof, reference being had to the accompanying drawings wherein FIGURES 1 and 2 are side elevations, partly in section, of the lower and upper portions respectively of a tree according to one form of the invention.

FIGURES 3, 4 and 5 are a side elevation and horizontal sections through a seal for the annulus in the tubing head;

FIGURE 6 is a view similar to FIGURE 1 showing a modification.

Referring now to FIGURE 1, there is shown the lower section of a well completion apparatus comprising a tubing head 10 adapted to be supported on and connected to a casing head (not shown) by flange 11. The upper end of a casing 13 is sealed within the lower end of the tubing head by seal 14. This seal is described more fully in United States Patent 2,715,536.

The tubing head is provided with outlet port 15 to which a valve 16 is connected to control flow from the casing annulus.

The upper end of tubing head 10 is provided with a tapered bowl 17 within which is seated a dual bore wrap around tubing seal 18 which is shown in detail in FIGURES 3, 4, and 5. As there shown the seal comprises a ring of sealing material 21 having a conical external surface 22 and two parallel cylindrical passages or ports 23 and 24 centered on a vertical diametral plane therethrough. The seal ring is split vertically at 25 between outer surface 22 and port 23 and at 26 between ports 23 and 24, the material between port 24 and surface 22 providing a hinge since the ring is made of rubber or similar material that is flexible and that makes a good seal.

Ring 21 is held between upper and lower split metal rings 31, 32 to which it is vulcanized or in other manner secured. Ring 31 has a lower cylindrical outer portion 33 and an upper conical portion 34. It has two ports 35, 36 therethrough aligned with ports 23, 24. Ring 31 is split at 37, 38, 39 in alignment with splits 25, 26. The two halves of ring 31 are connected at one side by hinge 40 and at the other by latch 41. Ring 32 has a tapered outer surface and two ports aligned with ports 23 and 24 and is split clear across on a vertical diametral plane aligned with splits 25, 26. It will be noted that seal 18 is split along a vertical diametral plane defined by the axes of the vertical passages therethrough.

Referring again to FIGURE 1, two sections of tubing 51, 52, constituting the upper portions of two tubing strings, extend up through seal 18. The upper ends of these tubing sections are upset at 53, 54 to provide material for threads 55, 56. In order that seal 18 may be as close as possible to the ends of the tubing sections, the ports 35, 36 are counterbored to provide enlarged portions 57, 58 into which the upset ends 53, 54 can freely enter. Seal 18 is locked in place and compressed by screws such as 59 passing through flange 60 of the tubing head and engaging with conical surface 34.

Mounted on flange 60 is a suspension ring 70, which is sealed to flange 60 by a steel ring gasket 71. Ring 70 has two bores 72, 73 centered on a diametral plane and adapted to be aligned with tubing sections 51, 52. Bore 72 is threaded at its lower end to receive thread 55 of tubing section 51 and at its upper end to receive tubing nipple 80.

Bore 73 is provided with an inturned flange 81 at its lower end to support a pipe coupling 82 which is threaded at its lower end to receive thread 56 of tubing section 52 and at its upper end to receive tubing nipple 83. The exterior of coupling 82 has a smaller diameter than bore 73 except for a flange 84 at its lower end which is slidable within bore 73 and centers the coupling. A packing 85 between bore 73 and coupling 82 is compressed by a ring 86 screwed into a threaded counterbore in the upper end of bore 73.

The above described connection of tubing sections 51, 52 to suspension ring 70 enables one of the tubing sections to be connected to the ring by a simple threaded connection which occupies a minimum of radial space. The other connection cannot be the same since the ring cannot be rotated to couple it to the other tubing section once it has been screwed onto the first tubing section and since the long tubing string cannot easily be rotated. The second tubing string is therefore hung on a coupling and packed off, providing a suspension which does not require rotation of either the tubing or the suspension ring. Although this type of suspension requires a larger radial extend than the threaded suspension, there is still sufficient metal between the two suspensions to provide adequate strength, since the simple threaded connection does not take up much room, extending radially only the depth of the thread.

Mounted on top of ring 70 is dual valve 90, of the Christmas tree assembly which has a lower flange 91 sealed to the ring 70 by a steel ring gasket 92. Flanges 91 and 60 and ring 70 are held together by through bolts such as 93. If valve flange 91 is of smaller diameter than tubing head flange 60, an adapter flange may be substituted for ring 70.

The dual valve 90 may be of any desired type. Preferably it comprises two automatic plastic sealed gate valves of the type described in United States Patents 2,317,657 issued Apr. 27, 1943 entitled "Conduit Valve" and 2,433,638 issued Dec. 30, 1947 entitled "Automatic Lubricate Valve," the two valves being disposed in a unitary housing as shown in FIGURES 1 and 2 hereof.

On top of valve 90 is disposed a dual T 100, the lower flange of the T being sealed to the upper flange of valve 90 by ring 101 and held in place by through bolts 102. On top of T 100 is another dual valve 103 similarly sealed and bolted, and the top of valve 103 covered with a protecting plate 104 sealed and bolted thereto in like manner.

In order to provide connections between the dual bores of ring 70, valve 90, T 100, and valve 103, there are provided connecting means comprising pipes and seals which are the same in each case so that only the connection between T 100 and valve 103 will be described. It comprises two pipes 110, 111 screwed into counterbores 112, 113 in the top of the T. The pipes extend up into single counterbore 114 in the bottom flange of valve 103 and thence into two smaller counterbores 115, 116 in the body of the valve and finally into two still smaller counterbores 117, 118, all concentric with flow passages 119, 120 of the valve. Packing 121, 122 in counterbores 115, 116 and around the pipes 110, 111, is adapted to be compressed by gland rings 123, 124, which in turn are pushed upwardly by dual bore compression ring 125, which is forced upwardly by a plurality of screws 126 disposed around the periphery of the valve flange. It will be seen that this type of connection allows the upper unit, that is, valve 103, to be placed on top of the lower unit, that is, T 100, and thereafter the two pieces sealed to the two bores of valve 103 by tightening the lock screws 126. If desired, the connection could be reversed by screwing the pipes into the upper member and telescoping and packing them in the lower member.

Referring now to FIGURE 6 there is shown a modification of the apparatus shown in FIGURE 1. The apparatus is generally similar in that it includes the same tubing head 10 having a flange 11 resting on top of a casing head 12 in which a casing 13 is suspended. Also, the upper end of the casing is sealed in the tubing head at 14. The principal difference lies in the omission of suspension ring 70, the valve 90 being disposed directly on top of the tubing head. Instead of suspending the tubings 151 and 152 in a suspension ring, they are suspended in a hanger 153.

The hanger 153 is of circular cross-section and has a tapered or conical seat 154 adapted to rest on tapered bowl 17 of the tubing head. A plurality of packing rings 155, 156 are compressed and the hanger is held in place by means of lock screws 59, the same as seal 18 of the FIGURE 1 embodiment is compressed and held in place.

The hanger 153 is provided with two passages therethrough, similar to seal 18. However, one of the passages 160 is threaded at its upper and lower ends to receive the top of tubing 151 and the lower end of pipe nipple 161. The other passage 162 is provided with a series of counterbores to receive coupling 170 screwed onto the top of tubing 152, packing 171 around the coupling, and compression ring 172 on top of the packing, the counterbore for ring 172 and the ring itself being screw threaded.

A pipe nipple 173 is screwed into the top of coupling 170. The upper ends of pipes 161 and 173 may be sealed within valve 90 by means the same as shown in FIGURE 1 or they can be sealed by the modified arrangement shown in which a single dual bore packing 180 having an outer diameter the same as that of dual bore compression ring 125 is compressed against the lower face 181 of the body of valve 90, being held within counterbore 182. Lock screws 126 force ring 125 upwardly the same as in the FIGURE 1 embodiment.

Comparing the embodiments of FIGURES 1 and 6, it will be noted that in both embodiments the suspension means, ring 70 or hanger 153 is screwed onto one of the tubings 51 or 151, by rotating the suspension means 70 or 153 around the tubing 51 or 151 and the other tubing string is hung in the suspension means 70 or 153 on a coupling 82 or 170. This coupling is preferably of larger diameter than the coupling used in the rest of the tubing string so that the tubing can be run through the suspension means.

Differences between the FIGURES 1 and 6 embodiments appear in comparing the setting of the tubing strings. With the FIGURE 1 embodiment, the first string of tubing 51 is run through the usual blowout preventers (not shown) mounted on top of the tubing head 10 and a temporary dual bore hanger (not shown) similar to the lower ring 32 of the seal 18 is wrapped around the tubing 54 and dropped through the preventers into the bowl 17 of the tubing head 10. That string of tubing 51 is then suspended by one of the tubing string couplings resting on top of the hanger. Then the other string of tubing 12 is run through the preventers and an enlarged bore in the temporary hanger and finally suspended in the temporary hanger by an enlarged coupling. The preventers are then removed and the first string of tubing 51 is lifted out of the hanger and the suspension ring 70 screwed thereon. Then the other tubing string 52 is lifted and run through the adapter flange 70 and connected therein. The temporary hanger is removed from the bowl 17 of the tubing head 10 and the seal 18 is substituted therefore and the suspension ring 20 is placed on top of the tubing head 10 and the rest of the tree, including valve 90 and the elements thereabove, is assembled thereon.

In the FIGURE 6 embodiment the temporary hanger is eliminated. After the first string of tubing 151 is run the permanent hanger 153 is screwed onto the tubing 151 and lowered into the bowl 154. Then the second string of tubing 152 is run through the preventers and the enlarged opening 162 of the hanger and finally an enlarged coupling 170 is seated in the hanger 153. The well can thus be placed under the full control before the preventers are removed and the rest of the tree including valve 90 and the elements thereabove, are assembled on top of the tubing head. With this construction when the well is to be reworked the tree can be removed clear down to the tubing head and workover preventers placed on top and then the strings can be pulled through the preventers.

While preferred embodiments of the invention have been shown and described, many modifications thereof can be made by one skilled in the art without departing from the spirit of the invention, and it is desired to protect by Letters Patent all forms of the invention falling within the scope of the following claims.

I claim:

1. Well completion method for dual parallel tubing string wells comprising screwing one bore of a dual bore support means above a well onto the upper end of one string of tubing in the well, the other bore of said support means having means for supporting a suspension means, placing the other string of tubing through blowout preventer means mounted above said support means and through the other bore of said support means and into the well so that the upper end of said second string of tubing extends above the upper end of said blowout preventer means, screwing a suspension means onto the upper end of said second string of tubing, and lowering said second string of tubing and suspension means through said blowout preventer means until said suspension means engages said other bore of said dual bore support means to be supported by said suspension means supporting means of said other bore.

2. The method of completing a dual production zone parallel tubing string well comprising running a first string of tubing through preventers, placing a temporary dual bore hanger around said first tubing string and lowering the hanger into a tubing head, suspending the first string of tubing in said hanger by means of a coupling, running a second string of tubing through the preventers and hanger, suspending the second string of tubing in the hanger by means of an enlarged coupling, removing the preventers, lifting one string of tubing and removing the coupling and screwing one bore of a dual bore suspension ring thereon, extending the upper end of the other string of tubing through the other bore of said ring and removing the enlarged coupling and screwing a hanging means thereon and lowering it into the suspension ring, removing the temporary hanger from the tubing head, placing a dual bore seal around the two strings of tubing and lowering the two strings to seat the seal in the tubing head and the ring on the tubing head.

3. The method of completing a dual production zone parallel tubing string well comprising running a first string of tubing through a preventer, placing a temporary suspension means including means for supporting a suspension coupling on said first tubing string and lowering the suspension means through the preventer into a well head, suspending the first tubing string in said well head by means of said suspension means, running a second string of tubing through the preventer, suspending the second tubing string in the well head by means of a suspension coupling supported by said suspension means, removing the preventer, connecting a Christmas tree element to said tubing strings, and then with the tubing strings and said Christmas tree element elevated placing a dual bore seal around the two tubing strings beneath said Christmas tree element and lowering the two tubing strings and Christmas tree element to seat the seal.

4. The method of completing a dual production zone parallel tubing string well comprising running a first string of tubing through a preventer, placing a suspension means including means for supporting a suspension coupling on said first string and lowering the suspension means through the preventer into a well head, suspending the first tubing string in said well head by means of said suspension means, running a second string of tubing through the preventer, suspending the second tubing string in the well head by means of a suspension coupling supported by said suspension means, removing the preventer, and connecting a dual bore Christmas tree element to said tubing strings by inserting nipples in said suspension means and suspension coupling forming the uppermost parts of said tubing strings and by placing the bores of said tree element and sealing means therefor around the two tubing strings with said sealing means disposed adjacent the lower end of said Christmas tree element and above said suspension means and suspension coupling to seal between said tubing strings and Christmas tree element.

5. The method of completing a dual production zone parallel tubing string well comprising running a first string of tubing through a preventer and well head into a well, suspending the first tubing string in said well head by means of a first suspension means including means for supporting a second suspension means, running a second string of tubing through the preventer, suspending the second tubing string in the well head by means of a second suspension means supported by said first suspension means, then, after both strings of tubing have been run and suspended, removing the preventer, inserting nipples in said first and second suspension means forming the uppermost parts of said tubing strings, placing a dual bore Christmas tree element, including near the bottom thereof sealing means for each bore and a dual bore sealing means actuator, around the tubing strings and connecting said tree element to said well head to form a tree, said sealing means and dual bore sealing means actuator being thereby disposed above said first and second suspension means to seal between said nipples and said tree element.

6. The method of completing a dual production zone parallel tubing string well comprising running a first string of tubing through a preventer, placing a suspension means including means for supporting a suspension coupling on said first string and lowering the suspension means through the preventer into a well head, suspending the first tubing string in said well head by means of said suspension means, running a second string of tubing through the preventer, suspending the second tubing string in the well head by means of a suspension coupling supported by said suspension means, removing the preventer, and connecting a Christmas tree element to said tubing strings by inserting nipples in said suspension means and suspension coupling forming the uppermost parts of said tubing strings and energizing sealing means placed around the two tubing strings beneath said Christmas tree element.

7. The method of completing a plural production zone parallel tubing string well comprising separately running plural tubing strings through a tubing head into the well, suspending the tubing strings by suspension means supported by said well head, said suspension means forming upward extensions of said tubing strings, actuating from alongside the tubing head screw means extending from the exterior of the tubing head to a plural bore seal means inside the tubing head to energize the seal means, further extending the tubing strings upwardly above said tubing head and suspension means for connection into a plural bore valve by connecting a tubing nipple coaxially above the suspended portion of each tubing string in fluid flow relationship therewith through said suspension means, telescoping the bores of the valve over the nipples, and energizing means sealing between the valve bores and nipples, the previously energized dual bore seal means in the tubing head sealing between the tubing head and the portion of the tubing strings below said valve.

8. The method of completing a plural production zone parallel tubing string well comprising running a first string of tubing through blowout preventer means and a well head into the well so that the upper end of said first string of tubing extends above the upper end of said blowout preventer means, screwing a first suspension means to the upper end of said first string of tubing, lowering said first string of tubing and said first suspension means through said blowout preventer means until said first string of tubing is supported by said well head by means including said first suspension means, running a second string of tubing through said well head and preventer means past said first suspension means into the well so that the upper end of said second string of tubing extends above the upper end of said blowout preventer means, screwing a second suspension means to the upper end of the second string of tubing, lowering said second string of tubing and second suspension means through said blowout preventer means until said second string of tubing is supported by said well head by means including said second suspension means, removing said blowout preventer means, and connecting a plural bore Christmas tree element to said tubing strings through nipple means inserted in said first and second suspension means.

9. The method of completing a plural production zone parallel tubing string well comprising:
as a first procedure running plural strings of tubing consecutively into a well, said running procedure including:
independently of any other string running a first string of tubing through a preventer,
installing around said first string of tubing suspension means including means for supporting a suspension coupling and lowering the suspension means through the preventer into a well head,
suspending the first tubing string in the well head by means of said suspension means,
independently of any other string running a second string of tubing through the preventer, and
suspending the second tubing string in the well head by means of a suspension coupling supported by said suspension means;
then as a second procedure completing the suspension and sealing of said first and second tubing strings preparatory to connecting a plural bore valve in fluid flow relationship with said tubing strings,
said completing procedure including lengthening said tubing strings by connecting a flow nipple means in fluid flow relationship with the previously run in part of each tubing string,
said completing procedure also including placing a dual bore seal in the well head around the two tubing strings and energizing the dual bore seal by applying pressure thereto,
said completing procedure also including removing said preventer; and
then as a third procedure connecting a dual bore valve to said tubing strings by placing the bores of the valve over the flow nipple means forming the upper ends of the tubing strings and energizing seal means juxtaposed the lower end of the valve to form second seals with said tubing strings above said dual bore seal in the well head.

10. Well completion method for plural production zone parallel tubing string wells comprising, independently of any other string running a first string of tubing through blowout preventer means and a wellhead into a well, suspending the upper end of said first string of tubing in the wellhead by suspension means including a first threaded hanger means screwed onto the upper end of said first string of tubing and having a flow passage therethrough communicating with said first string of tubing and having a flow nipple extending upwardly therefrom, running a second string of tubing through said blowout preventer means and wellhead past said first threaded hanger means into the well, suspending the upper end of said second string of tubing in the wellhead by suspension means including a second threaded hanger means screwed onto the upper end of said second string of tubing and having a flow passage therethrough communicating with said second string of tubing and including a flow nipple extending upwardly therefrom, prior to removing said blowout preventer activating lock screws through said wellhead to engage part of said suspension means to prevent upward travel thereof, removing the blowout preventer and blocking the path of upward travel of said flow nipples by placing the bore sockets of a plural bore valve over said flow nipples and connecting the valve to the wellhead thereby to supplement the hold down of said tubing strings provided by the lockscrews engaging said suspension means for said tubing strings disposed in said wellhead.

11. In the completion of a plural production zone parallel tubing string well, the method of running and suspending the tubing under pressure control comprising:
independently of any other string of tubing running a first string of tubing into the well through a blowout preventer and a well head,
placing a plural bore hanger around the first string of tubing with the tubing extending into only one bore of the hanger leaving a second bore clear,
lowering the hanger down the tubing through the preventer into the well head,
connecting a coupling to said first string of tubing,
lowering the coupling through the preventer onto the hanger,
suspending the first string of tubing in said well on said coupling,
independently of said first string of tubing running a second string of tubing into the well through the preventer and the clear second bore of said hanger,
connecting to said second string of tubing a coupling too large to pass through said second bore of the hanger,
suspending the second string of tubing in the well on the second coupling, and
thereafter removing the preventer.

12. In the completion of a plural production zone parallel tubing string well, the method of running, suspending and sealing the tubing under pressure control comprising
independently of any other string of tubing running a first string of tubing into a well through a blowout preventer and a well head,
placing one bore of a plural bore hanger around the upper end of the tubing string,
lowering the hanger through the preventer into the well head, suspending the first string of tubing from said one bore of the hanger leaving a second bore clear, independently of said first string of tubing running a second string of tubing into the well through the preventer and the clear second bore of said hanger, connecting to said second string of tubing a coupling too large to pass through said second bore of the hanger, lowering the second coupling through the preventer onto the hanger, suspending the second string of tubing in the well on said coupling, pressurizing packing supported by the hanger in the well head by applying pressure to the packing to block off any fluid flow outside the tubing strings past said packing, and thereafter removing the preventer.

13. The method of completing a plural production zone parallel tubing string well comprising:

independently of any other string of tubing running a first string of tubing into the well through a blowout preventer and a well head, screwing a first tubing hanger means onto the upper end of said first string of tubing, lowering the first tubing hanger means through the preventer into the well head leaving an opening through the well head therepast, suspending the first string of tubing from said first tubing hanger means, independently of said first string of tubing running a second string of tubing into the well through the preventer and said opening left in the well head past said first tubing hanger means, screwing onto the upper end of the second tubing string a second tubing hanger means of a shape similar to that of said opening through the well head adjacent the first tubing hanger means but too large to pass completely therethrough, lowering the second tubing hanger means through the preventer into said opening, suspending the second string of tubing in the well from said second tubing hanger means, pressurizing packing encompassing the hanger means to seal off any fluid flow outside the tubing strings past said packing, thereafter removing the preventers, connecting a plural bore tree to said tubing strings through nipple means extending upwardly from said hangers, and connecting said tree to said well head.

References Cited

UNITED STATES PATENTS

| 381,013 | 4/1888 | Hoadley | 166—189 |
| 780,861 | 1/1905 | Buzard | 287—52.03 X |
| 2,153,852 | 4/1939 | Tschappat | 166—75 |
| 2,335,355 | 11/1943 | Penick et al. | 166—89 X |
| 2,768,841 | 10/1956 | Allen | 285—143 |
| 2,850,099 | 9/1958 | Brown | 166—75 X |
| 2,885,005 | 5/1959 | Rhodes | 166—75 |
| 2,965,173 | 12/1960 | Brown | 166—189 X |

FOREIGN PATENTS 783,396   9/1957   Great Britain.

JAMES A. LEPPINK, *Primary Examiner.*

U.S. Cl. X.R.

166—89; 285—137

PO-1050
(5/69)

UNITED STATES PATENT OFFICE
CERTIFICATE OF CORRECTION

Patent No. 3,451,481     Dated June 24, 1969

Inventor(s)   C. P. LANMON II

It is certified that error appears in the above-identified patent and that said Letters Patent are hereby corrected as shown below:

Column 3; line 8, after "surface" insert --42;
line 52, change "extend" to --extent--. Column 4; line 67,
after "string" insert --52 or 152--; line 68, after "coupling"
insert --82 or 170--; line 69, change "coupling" to --couplings·
Column 5; line 17, change "therefore" to --therefor--;
line 28, cancel "the", first occurrence.

SIGNED AND
SEALED

SEP 9 - 1969

(SEAL)
Attest:

Edward M. Fletcher, Jr.
Attesting Officer

WILLIAM E. SCHUYLER, JR.
Commissioner of Patents